(12) United States Patent
Cazalis et al.

(10) Patent No.: US 12,384,543 B2
(45) Date of Patent: Aug. 12, 2025

(54) SEAT UNIT WITH A FOLDING PRIVACY SHIELD

(71) Applicant: Safran Seats, Plaisir (FR)

(72) Inventors: Olivier Cazalis, Moissy-Cramayel (FR); Laurent Ligonniere, Moissy-Cramayel (FR); Mourad Rajhi, Moissy-Cramayel (FR); José Bernardo De Morais, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 74 days.

(21) Appl. No.: 18/265,917

(22) PCT Filed: Dec. 8, 2021

(86) PCT No.: PCT/EP2021/084743
§ 371 (c)(1),
(2) Date: Jun. 7, 2023

(87) PCT Pub. No.: WO2022/122802
PCT Pub. Date: Jun. 16, 2022

(65) Prior Publication Data
US 2024/0034474 A1 Feb. 1, 2024

(30) Foreign Application Priority Data
Dec. 10, 2020 (EP) .................................... 20213063
Feb. 18, 2021 (FR) ...................................... 2101591

(51) Int. Cl.
*B64D 11/06* (2006.01)
(52) U.S. Cl.
CPC ...... *B64D 11/0641* (2014.12); *B64D 11/0606* (2014.12)
(58) Field of Classification Search
CPC . B60N 2/008; B60N 2/32; B60N 2/34; B60N 2/345; B64D 11/0023;
(Continued)

(56) References Cited

U.S. PATENT DOCUMENTS 7,721,990 B2 * 5/2010 Jaeger ................ B64D 11/0606
244/118.6
8,979,189 B2 * 3/2015 Henshaw ........... B64D 11/0604
297/135
(Continued)

FOREIGN PATENT DOCUMENTS

| EP | 3546357 A1 * | 10/2019 | ......... B64D 11/0601 |
| WO | 2015155687 A1 | 10/2015 | |
| WO | 2018093825 A1 | 5/2018 | |

OTHER PUBLICATIONS

International Patent Application No. PCT/EP2021/084743, International Search Report and Written Opinion, dated Mar. 14, 2022.
(Continued)

*Primary Examiner* — Joshua E Rodden
(74) *Attorney, Agent, or Firm* — Kilpatrick Townsend & Stockton LLP (57) ABSTRACT

The present invention relates to an aircraft seat unit having:
a seat that can be moved between a seated position and a reclining position,
a privacy shield extending at least partly around the seat,
the privacy shield with a fixed portion and a movable portion that can be moved relative to the fixed portion,
the movable portion being movable between:
a retracted position in which the movable portion delimits, with the fixed portion, a partially enclosed space around the seat to give the passenger privacy and
a deployed position in which the movable portion is at a distance from the seat so as to free up space for accessing the seat.

9 Claims, 13 Drawing Sheets

(58) Field of Classification Search
CPC ............ B64D 11/0601; B64D 11/0602; B64D 11/0604; B64D 11/0606; B64D 11/0639; B64D 11/06395; B64D 11/064; B64D 11/0641; B64D 11/0642; B64D 11/0643; B64D 11/0644; B64D 11/0693; B64D 11/0696
USPC ...................................................... 244/118.6
See application file for complete search history.

(56) References Cited

U.S. PATENT DOCUMENTS

| | | | |
|---|---|---|---|
| 10,246,192 B1* | 4/2019 | Prasad | B60N 2/20 |
| 11,299,274 B1* | 4/2022 | Davis | B64D 11/0644 |
| 2006/0097553 A1* | 5/2006 | Spurlock | B64D 11/06 |
| | | | 244/118.6 |
| 2020/0369387 A1* | 11/2020 | Yaghoubi | B64D 11/0604 |

OTHER PUBLICATIONS

International Patent Application No. PCT/EP2021/084743, English Translation of the Written Opinion of the International Searching Authority, dated Jun. 10, 2023.

\* cited by examiner

SEAT UNIT WITH A FOLDING PRIVACY SHIELD

CROSS REFERENCE TO RELATED APPLICATIONS

This application is a the United States national phase application of International Patent Application PCT/EP2021/084743 ("the '743 application"), filed on Dec. 8, 2021 and titled "SEAT UNIT WITH A FOLDING PRIVACY SHIELD," which application is related to and claims priority benefits of France Patent Application No. 2101591, filed on Feb. 18, 2021 ("the '591 application") and Europe patent application No. 20213063.9 ("the '639 application"), filed on Dec. 10, 2020. The '743, '591, and '639 applications are hereby incorporated in their entireties by this reference.

FIELD OF THE INVENTION

The present invention relates to a seat unit provided with a folding privacy shield. The invention finds a particularly advantageous application with seating units of "business class" and "first class" type.

BACKGROUND

In a manner known per se, such seat units each comprise a seat associated with a side console provided with storage compartments and a shield extending at least partly around the seat so as to delimit a semi-enclosed space around the passenger. Such a configuration makes it possible to guarantee the privacy of the passenger on the seat.

The seat offers the passenger different positions of comfort, from a "seated" position to a "lying" position, in which the seat defines a substantially horizontal sleeping surface so that the passenger can lie down. Intermediate comfort positions are also offered, such as the "relax" position in which the seat back is strongly reclined. Generally, these intermediate positions are obtained by the inclination of the pivoting seat back around a horizontal axis perpendicular to an axis of extension of the seat.

Conventionally, an aircraft cabin has groups of several columns of seat units one behind the other. Inside a column of seat units, the distance between two successive seat units (known as "pitch") is relatively small, in particular when the seats are arranged at an angle with respect to an axis of the aircraft cabin in order to optimize filling. Such a configuration therefore makes access to the seat difficult for people with reduced mobility that need to be transferred from their wheelchair to their seat by the flight crew.

BRIEF SUMMARY OF THE INVENTION

The invention aims to effectively remedy this drawback by proposing an aircraft seat unit comprising:
- a movable seat between a seated position and a lying position; and
- a privacy shield extending at least partly around the seat; the privacy shield comprising a fixed part and a movable part relative to the fixed part;
- the mobile part being mobile between:
  - a retracted position in which the movable part delimits with the fixed part a semi-enclosed space around the seat to provide privacy to the passenger; and
  - a deployed position in which the movable part is remote from the seat so as to clear an access space to said seat.

The invention thus makes it possible, thanks to the folding privacy shield via its movable part, to increase the dimension of access to the seat for configurations with a short pitch so as to facilitate the installation of a person with reduced mobility. The invention also makes it possible to facilitate access to the equipment of the seat, in particular access to the actuators or to the power boxes, in the event of maintenance operations.

According to one embodiment of the invention, the movable part is remote from the seat when it is in its deployed position, so that the seat in the lying position can extend beyond a vertical projection onto the floor of the semi-enclosed space delimited by the privacy shield when said privacy shield is in the retracted position.

According to one embodiment of the invention, the mobile part of the privacy shield comprises:
- a primary openable panel;
- a secondary openable panel;
- a first pivot connection being arranged between the primary flap and the secondary flap so as to allow rotation of the secondary flap relative to the primary flap about a first axis of rotation;
- a second pivot connection being arranged between the primary flap and the fixed part of the privacy shield so as to allow rotation of the primary flap relative to the fixed part about a second axis of rotation.

According to one embodiment of the invention, a pivot connection is formed by at least one hinge, in particular three hinges.

According to one embodiment of the invention, the hinge or hinges are of the invisible type.

According to one embodiment of the invention, said seat unit comprises a rod having a first end rotatably mounted with respect to the primary flap and a second end rotatably mounted with respect to a slider able to slide along a slide arranged on a lower portion of the fixed part of the privacy shield.

According to one embodiment of the invention, said seat unit comprises a device for locking and unlocking in rotation the secondary flap relative to the fixed part of the privacy shield.

According to one embodiment of the invention, the locking and unlocking device comprises a latch able to selectively cooperate with a striker in a locked state or to be disengaged from the striker in an unlocked state.

According to one embodiment of the invention, said seat unit comprises a device for locking and unlocking in rotation the primary flap relative to the fixed part of the privacy shield.

According to one embodiment of the invention, the locking and unlocking device comprises a finger able to partly surround in a selective manner a stud in a locked state and to be disengaged from the stud in an unlocked state.

According to one embodiment of the invention, said seat unit comprises a carriage carrying the movable part of the privacy shield, and at least one sliding connection allowing translational movement of the carriage relative to the fixed part in order to pass from the retracted position to the deployed position and vice versa.

According to one embodiment of the invention, the sliding connection(s) has/have a longitudinal direction parallel to or coinciding with an axis of the seat so as to allow movement of the movable part along the axis of the seat.

According to one embodiment of the invention, the movable part comprises two panels forming a non-zero angle relative to each other.

According to one embodiment of the invention, said seat unit comprises a device for locking and unlocking in translation the movable part relative to the fixed part of the privacy shield.

According to one embodiment of the invention, the locking and unlocking device comprises a hook-shaped lock movable in rotation between a locking position in which said lock cooperates with a corresponding locking pin integral with the movable part and an unlocking position in which said lock is disengaged from the locking pin.

According to one embodiment of the invention, the lock is arranged on a fixed upright.

According to one embodiment of the invention, the locking pin is arranged on a movable upright integral with the movable part.

According to one embodiment of the invention, the movable upright comprises at least one centering pin for cooperating with a corresponding shape in the fixed upright.

According to one embodiment of the invention, said seat unit comprises an access shutter to the locking and unlocking device.

According to one embodiment of the invention, an actuating means, such as a lever or a button, is capable of controlling movement of the mobile shutter from a closed position in which the shutter closes an access space to the locking and unlocking device to an open position in which the shutter opens the access space to the locking and unlocking device.

According to one embodiment of the invention, a cam device is mechanically connected on the one hand to the actuating means via a connecting rod and on the other hand to the shutter.

According to one embodiment of the invention, the locking and unlocking device comprises a clamping device on a support pallet of the seat.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, wherein:

BRIEF DESCRIPTION OF THE DRAWINGS

FIG. 1b is a perspective view illustrating the deployment of the secondary flap of the seat unit in FIG. 1a;

FIG. 1c is a perspective view illustrating the deployment of the primary flap of the seat unit in FIG. 1a;

DETAILED DESCRIPTION

It should be noted that the structural and/or functional elements common to the different embodiments have the same references. Thus, unless otherwise stated, such elements have identical structural, dimensional and material properties.

Furthermore, in the rest of the description, the relative terms such as "front", "rear", "horizontal" or "vertical" are understood by reference to the common meaning given to them by a passenger on a seat in the unit seat according to the invention.

Figure 1A:
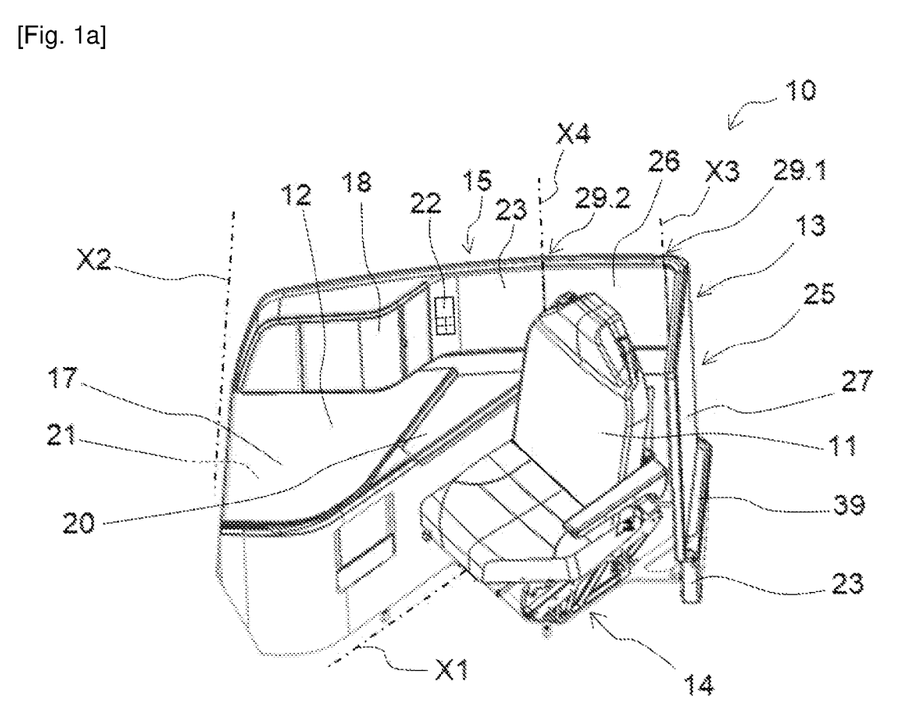
FIG. 1a is a perspective view of a first embodiment of a seat unit according to the invention provided with a privacy shield having a primary flap and a secondary flap hinged relative to each other.
Figure 8:
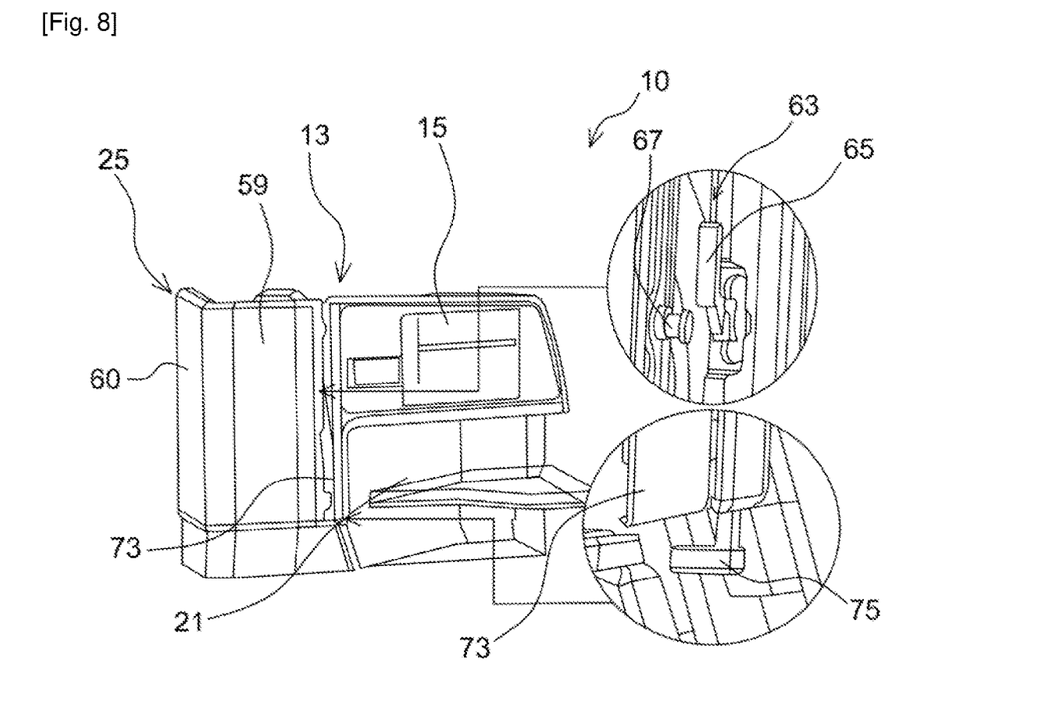
FIG. 8 is a rear view of the seat unit in FIG. 7a showing the detail of a device for locking and unlocking in translation the movable part arranged vertically along the fixed part.

FIG. 1a shows a seat unit 10 comprising a seat 11 associated with a side console 12 extending along one side of the seat 11. In addition, a so-called privacy shield 13 extends at least partly around the seat 11 so as to delimit a semi-enclosed space 14 around the passenger. Such a configuration makes it possible to guarantee the privacy of the passenger on the seat 11. A video screen 15 of a multimedia system or IFE (for Inflight Entertainment System) could be installed on a rear part of the privacy shield 13 so as to be usable by a rear passenger, as shown in FIG. 8.

The seat 11 is advantageously provided with a kinematics allowing it to be movable between a "seated" position, in which the seat 11 is configured to define a seated position for a passenger, and a "lying" position, in which the seat 11 is configured to define a sleeping surface for the passenger, advantageously substantially horizontal. Intermediate comfort positions are also offered, such as the "relax" position in which a seat back of the seat 11 is strongly inclined.

The seat 11 has an axis of extension X1 defined by the intersection of a horizontal plane and a vertical median plane of the seat 11 corresponding to a plane of symmetry of the seat 11. The axis of extension X1 of the seat 11 may form a non-zero angle relative to a central axis X2 of the aircraft cabin, for example of about 45 degrees. In this case, the seat 11 is turned towards the axis X2. As a variant, the seat 11 could be turned in a direction opposite to the axis X2.

In the example shown, the console 12 comprises a horizontal upper wall 17 forming a table surface on which a passenger can place objects. On the side of its rear end, a vertical storage space 18 may be provided that comprises one or more elements among a literature pocket, a bottle holder, or a minibar. The choice of storage compartments is configurable according to the wishes of the airline. In addition, a portion 20 of the console 12 may have an armrest function.

The console 12 may also include a housing 21, said foot housing, having a horizontal inner face forming a footrest (or ottoman) for a passenger installed on a seat 11 in a rear seat unit 10. The foot housing is clearly visible in FIGS. 7a and 8.

A control unit 22 (called "PCU" for 'Passenger Control Unit") is arranged near the passenger. The control unit 22 makes it possible to control the selection of a position of the seat 11 as well as the environment of the seat 11, namely a video system, a heating device, a lighting ambiance, or any other parameter of the environment of the seat 11.

The privacy shield 13 comprises a fixed part 23 and a mobile part 25 with respect to the fixed part 23. The fixed part 23 comprises one panel or more integral with the console 12.

Figure 1B:
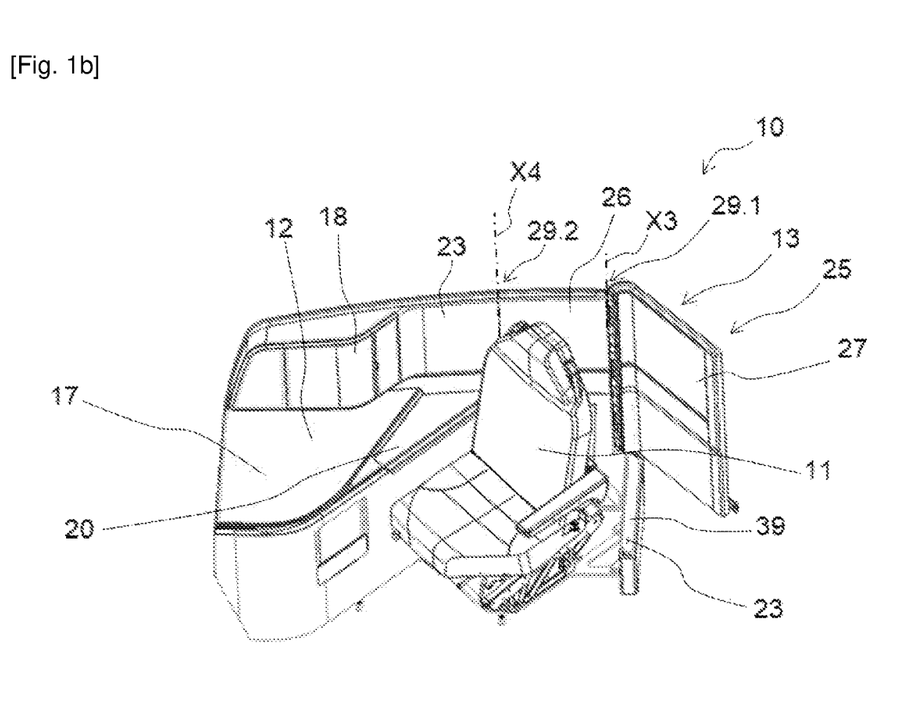
Figure 1C:
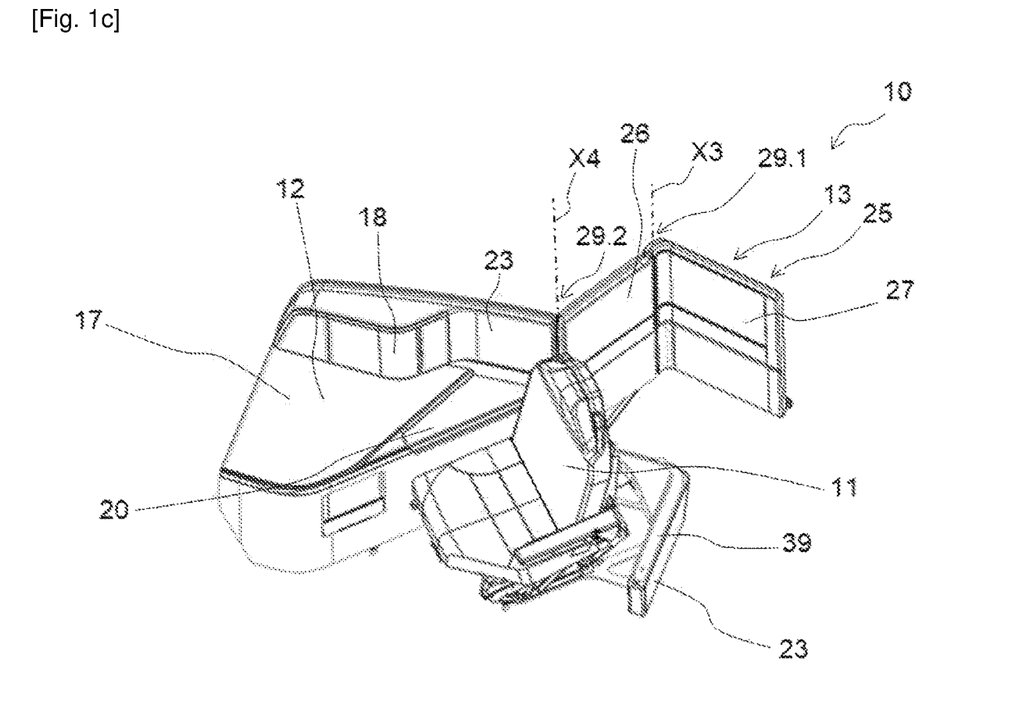
Figure 7A:
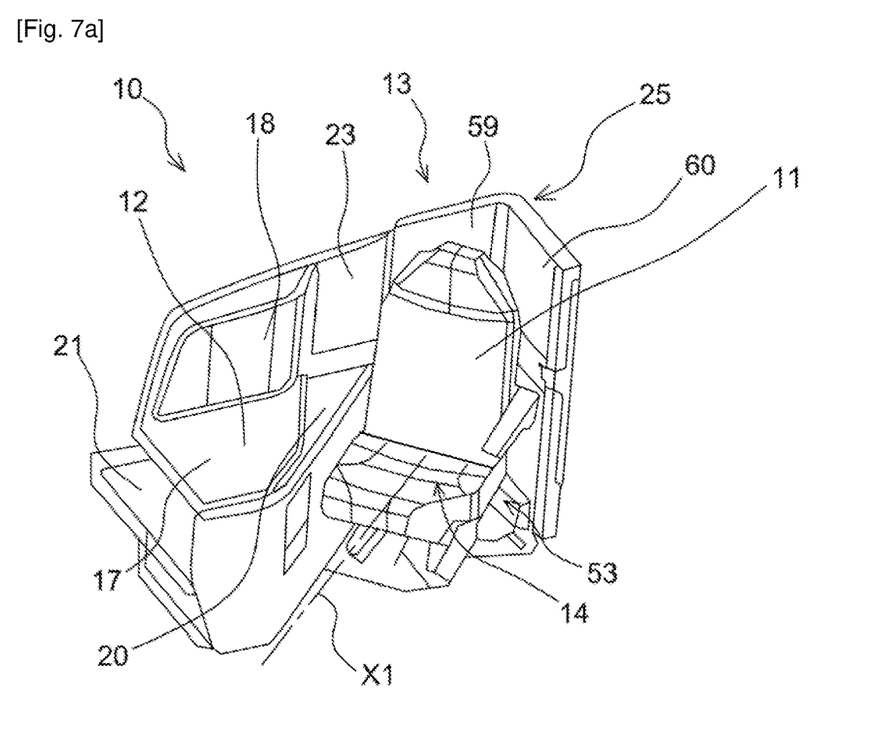
FIG. 7a is a perspective view of a second embodiment of a seat unit according to the invention provided with a privacy shield having a movable part mounted on a carriage that is movable in translation.
Figure 7B:
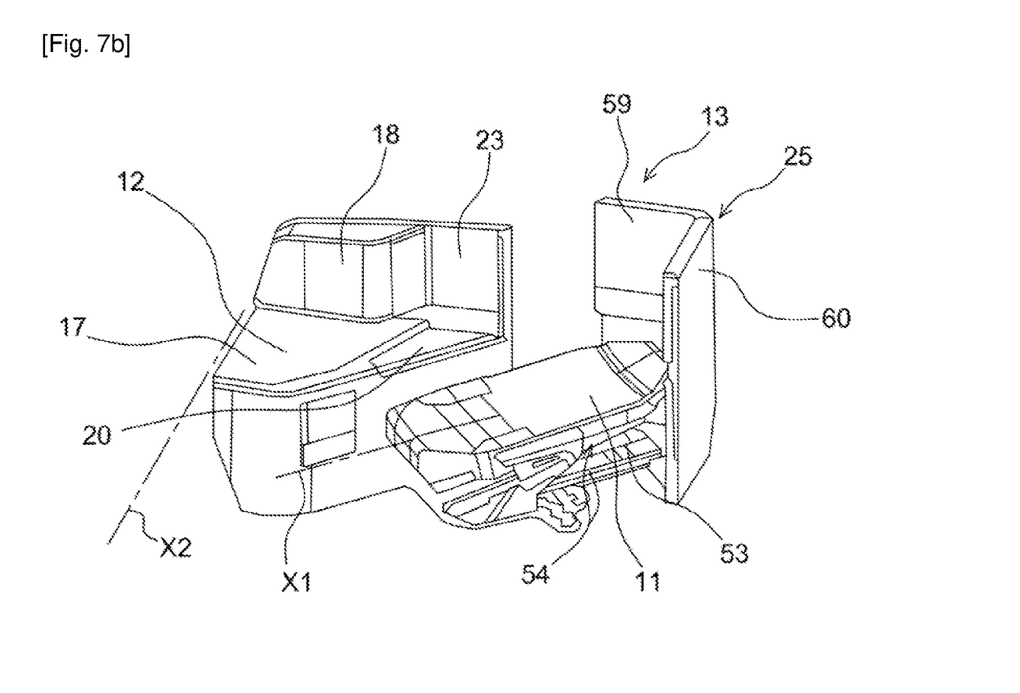
FIG. 7b is a perspective view showing the movable part of the privacy shield in a deployed position.

The movable part 25 is movable between a retracted position shown in FIG. 1a or 7a in which the movable part 25 delimits with the fixed part 23 the semi-enclosed space 14 around the seat 11 to confer privacy to the passenger and a deployed position shown in FIG. 1c or 7b in which the privacy shield 13 is remote from the seat 11 so as to clear an access space to the seat 11. The distance of the movable part 25 from the seat 11 is appreciated relative to the position occupied by the movable part 25 in the retracted position.

Advantageously, the movable part 25 is remote from the seat 11 when it is in the deployed position, so that the seat 11 in the lying position can extend beyond the semi-enclosed space 14 delimited by the movable part 25 in the retracted position to facilitate installation of a person with reduced mobility. In particular, as can be seen in particular in FIG. 1d, the seat 11 in the lying position extends beyond a vertical projection onto the ground of the semi-enclosed space 14 shown in hatched lines and delimited by the shield privacy 13 when said privacy shield 13 is in the retracted position.

In the embodiment in FIGS. 1a-1d, 2a-2d, and 3, the movable part 25 of the privacy shield 13 comprises a primary flap 26 and a secondary flap 27. A first pivot connection 29.1 is arranged between the primary flap 26 and secondary flap 27 so as to allow rotation of the secondary flap 27 relative to the primary flap 26 around a first axis of rotation X3. A second pivot connection 29.2 is arranged between the primary flap 26 and the fixed part 23 of the privacy shield 13 so as to allow rotation of the primary flap 26 relative to the fixed part 23 around a second axis of rotation X4.

In the retracted position, the primary flap 26 forms a non-zero angle with respect to the secondary flap 27, in particular an angle of about 90 degrees. The flaps 26, 27 thus have a configuration making it possible to at least partially surround the seat 11 so as to confer privacy on the passenger.

Figure 3:
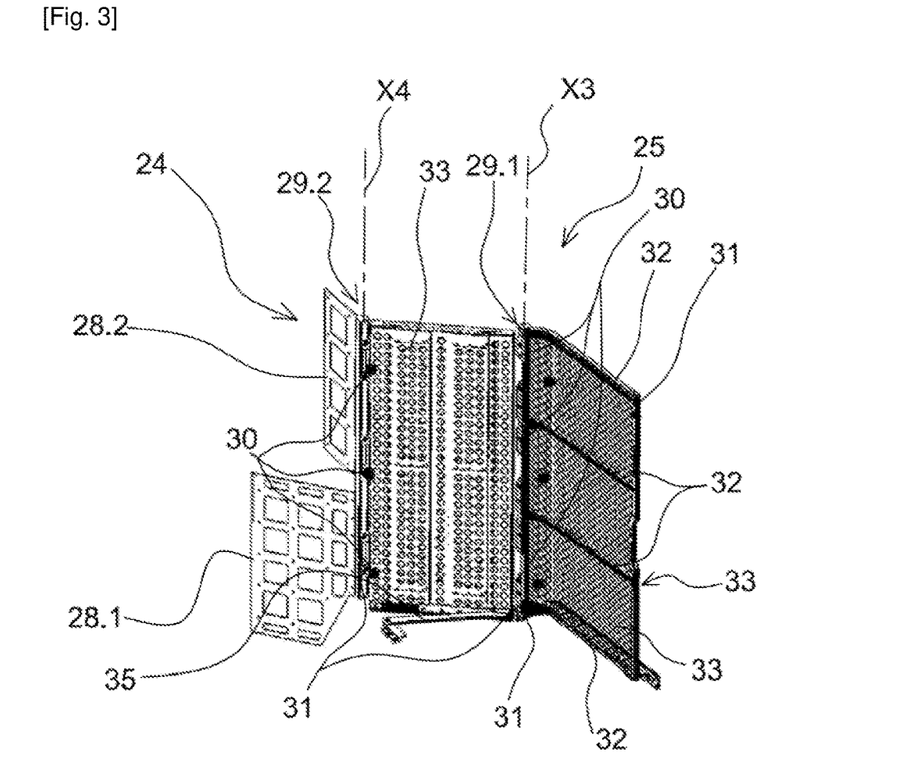
FIG. 3 is a perspective view of a structure forming the fixed part and the movable part of the privacy shield.

As can be seen in FIG. 3, a flap 26, 27 may be constituted by vertical uprights 31 (at least two at each of its ends), horizontal crosspieces 32, and two metal sheets 33 arranged on either side of this structural assembly formed by the uprights 31 and the crosspieces 32. The metal sheets 33 may be covered with internal and external lining panels, the finish of which is ensured in particular by means of a painted film or material. Alternatively, a flap 26, 27 may take the form of a panel made of a composite material.

A support structure 24 of the primary flap 26 is formed here by two panels 28.1, 28.2. The panel 28.1 is intended to be mechanically connected to a wall of the console 12 at the level of the foot housing 21. The panel 28.2 is fixed to a structural element of the console 12 so as to form at least a portion of the fixed part 23 of the privacy shield 13.

Advantageously, a pivot connection 29.1, 29.2 is formed by at least one hinge 30, in particular three hinges 30, as shown in FIG. 3. Thus, three hinges 30 are provided between the primary flap 26 and the secondary flap 27 and three hinges 30 between the primary flap 26 and the fixed part 23 of the privacy shield 13.

Figure 4A:
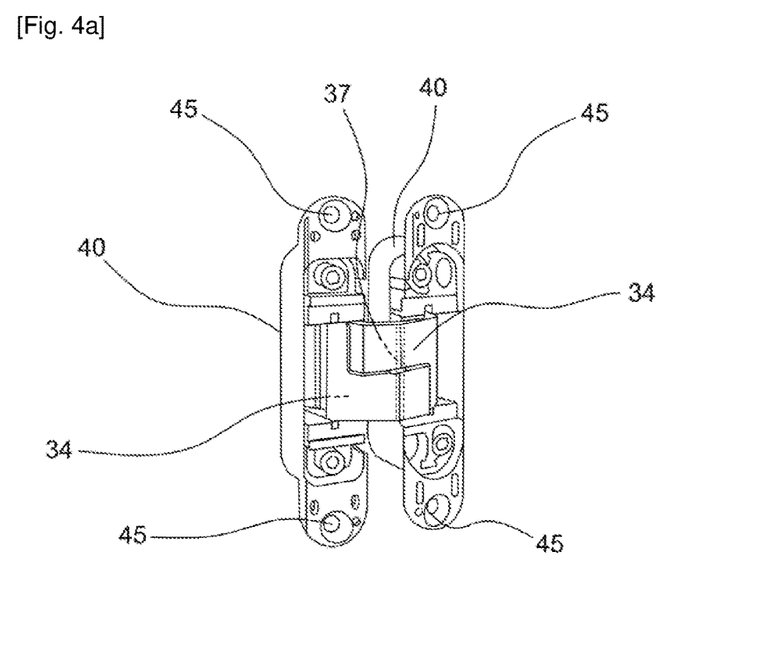
FIGS. 4a and 4b are respectively perspective and top views of a hinge of "invisible" type used to form the pivot connections of the flaps of the movable part.
Figure 4B:
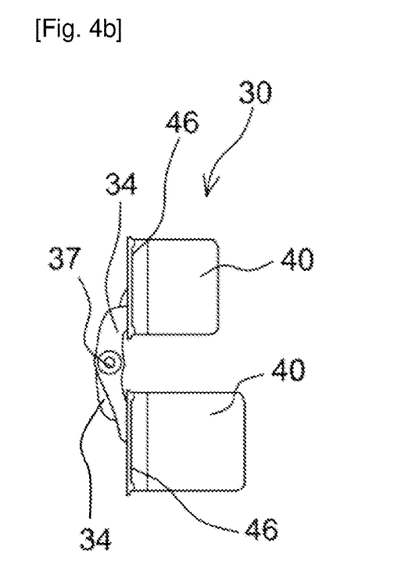

As illustrated by FIGS. 4a and 4b, a hinge 30 of so-called "invisible" type comprises two portions 34 hinged relative to each other around an axis 37. Each portion 34 comprises a projecting element 40, so-called knuckle eye, intended to be inserted inside a housing of corresponding shape provided in a thickness of a flap 26, 27. Each portion 34 also comprises a fixing interface 45 comprising passage holes for fasteners, such as screws. The fixing interface 45 may be covered by a cover 46 so as to hide the screw heads.

Such a configuration makes it possible to improve the perceived quality of the assembly by minimizing the play between the articulated elements in line with the cutout lines.

Figure 5:
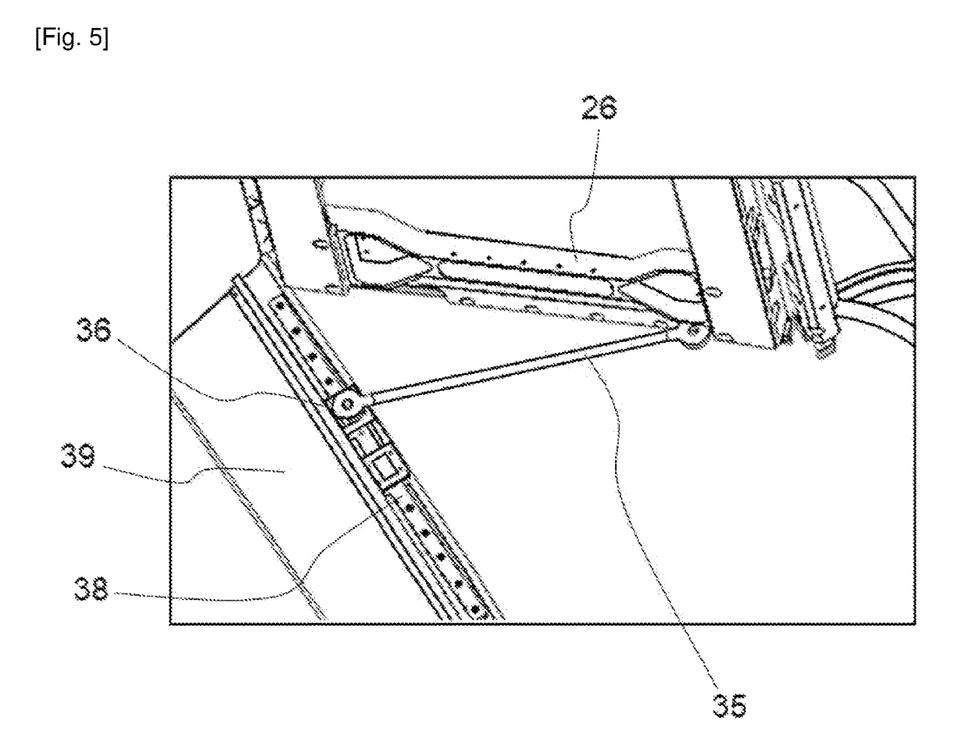
FIG. 5 is a perspective view of a rod/sliding connection assembly for supporting the cantilever of the movable part of the privacy shield.

Advantageously, as can be seen in FIG. 5, the seat unit 10 comprises a rod 35 having a first end rotatably mounted relative to the primary flap 26 and a second end rotatably mounted relative to a slider 36 adapted to slide along a slide 38 disposed on a portion of the fixed part 23. Such a configuration ensures the support of the mass and the cantilever of the secondary flap 27 in the deployed position.

In this case, the slide 38 is arranged on a lower portion 39 of the fixed part 23 of the privacy shield 13. The lower portion 39 is intended to be fixed to the floor of the aircraft cabin. The lower portion 39 comprises two walls forming a non-zero angle between them corresponding to the angle formed between the flaps 26, 27 when the movable part 25 is in the retracted position.

Figure 6:
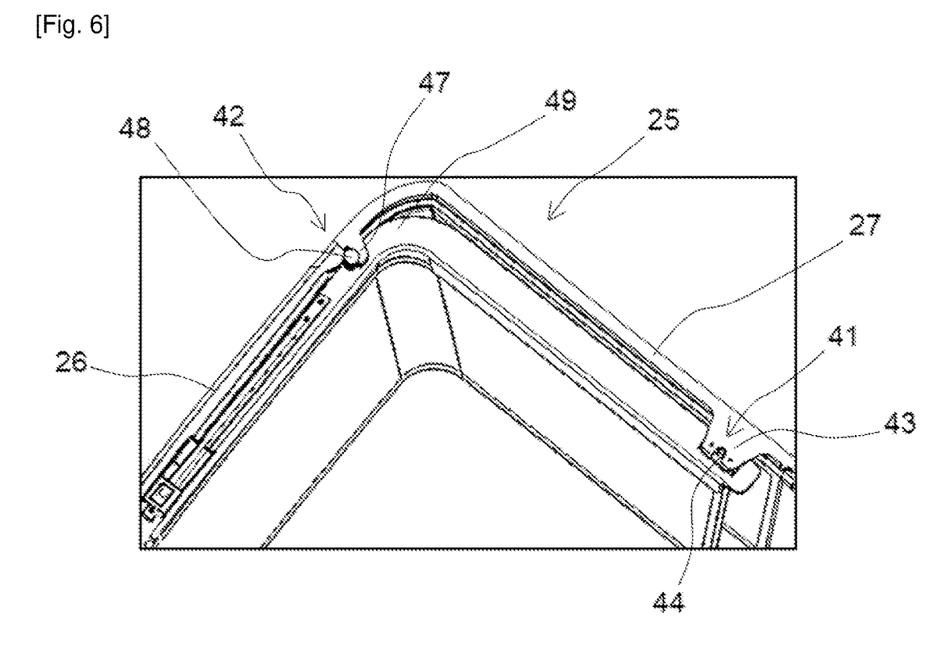
FIG. 6 is a bottom view of the primary and secondary flaps of the movable part of the privacy shield showing devices for locking and unlocking in rotation the flaps.

As can be seen in FIG. 6, the seat unit 10 comprises a device 41 for locking and unlocking in rotation the secondary flap 27 with respect to the fixed part 23 of the privacy shield 13, in particular with respect to the lower portion 39.

The locking and unlocking device 41 comprises a latch 43 able to selectively cooperate with a striker 44 in a locked state or to be disengaged from the striker 44 in an unlocked state. The latch 43 can be manipulated by a member of the crew or a maintenance team. The latch 43 is for example arranged on the movable part 25, more precisely the secondary flap 27, while the striker 44 is arranged on a protective element 49 with regards to external shocks, called "bumper" fixed on the lower portion 39. As a variant, the structure could be reversed, that is to say that the latch 43 is arranged on the protection element 49 while the striker 44 is arranged on the movable part 25.

Optionally, the seat unit 10 also comprises a device 42 for locking and unlocking in rotation the primary flap 26 with respect to the fixed part 23 of the privacy shield 13. The locking and unlocking device 42 comprises a finger 47 able to partly surround in a selective manner a stud 48 in a locked state and to be disengaged from the stud 48 in an unlocked state. The transition from one state to another is naturally effected by a snapping operation without any action from an operator other than the rotation of the primary flap 26. The finger 47 is for example disposed on the movable part 25 while the stud 48 is arranged on the protective element 49. Alternatively, the structure could be reversed, that is to say that the finger 47 is arranged on the protective element 49, while that stud 48 is arranged on mobile part 25. This "finger 47-stud 48" assembly also performs a mechanical force absorption function.

It is described below, with reference to FIGS. 1a-1d and 2a-2d, the operation of the privacy shield 13 of the seat unit 10 according to the invention able to deploy by rotation in two successive phases.

Figure 2A:
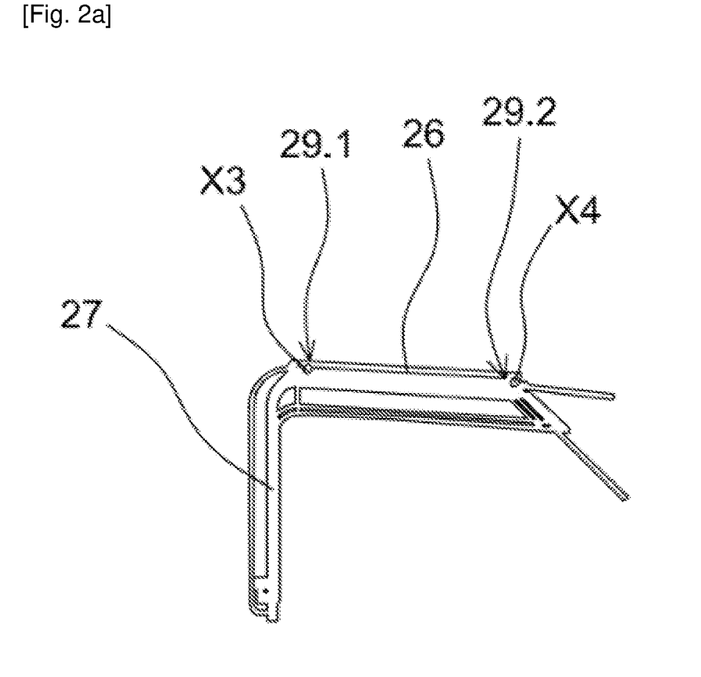
FIGS. 2a to 2d illustrate the evolution of the angles between the primary flap and the secondary flap during deployment of the movable part of the privacy shield.

Initially, as shown in FIGS. 1a and 2a, the movable part 25 of the privacy shield 13 is in the retracted position.

A crew member can then actuate the locking and unlocking device 41 so as to allow rotation of the secondary flap 27 with respect to the primary flap 26 around the axis X3.

Figure 2B:
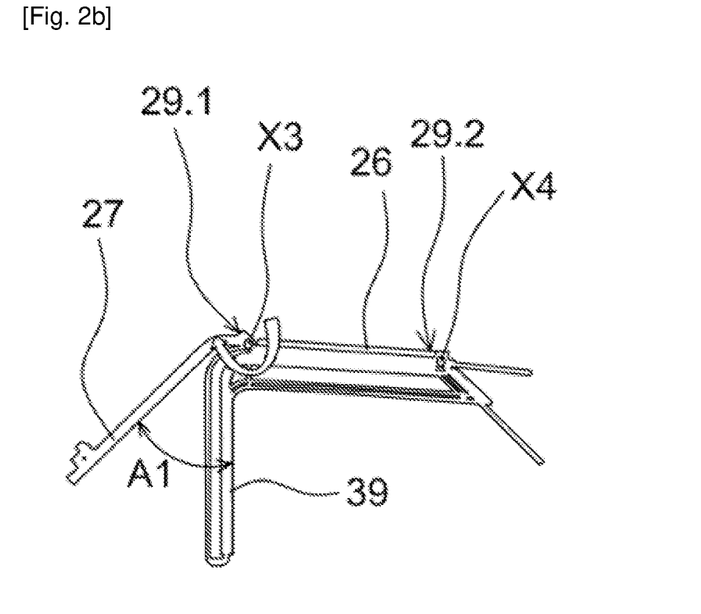

As can be seen in FIGS. 1b and 2b, the rotation of the secondary flap 27 is allowed until the angle A1 formed by the secondary flap 27 with respect to its retracted position reaches a limit angle, for example about 45 degrees. By "about" it is meant a variation of plus or minus 10 percent with respect to the value indicated.

Once the limit angle has been reached, the finger 47 of the device 41 disengages from the stud 48 so as to allow the rotation of primary flap 26.

Figure 2C:
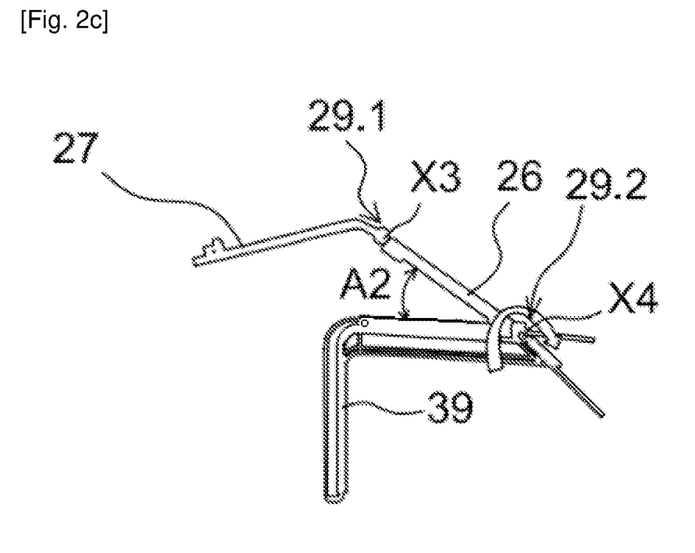

As can be seen in FIG. 2c, the rotation of the primary flap 26 is allowed until the angle A2 formed by the primary flap 26 with respect to its retracted position reaches a threshold angle, for example about 30 degrees, from which the rod 35-slide connection 38 system begins to deploy when the angle A2 increases.

Figure 2D:
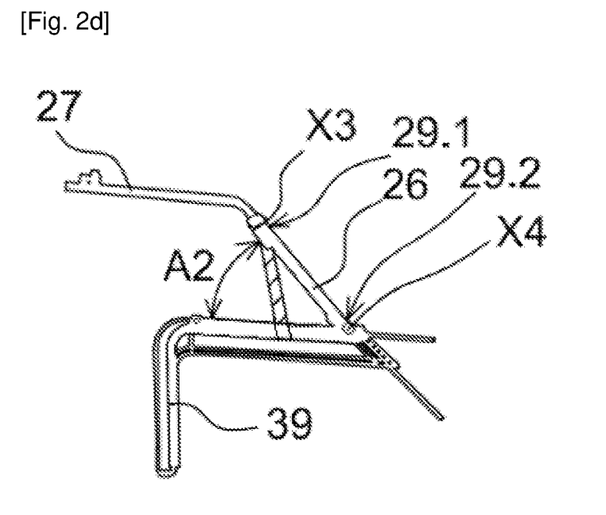

As shown in FIG. 2d, the slider 36 is then able to slide in translation along the slide 38, so that the angle A2 of the primary flap 26 can increase until it reaches a limit angle of about 55 degrees. In the deployed position, the rod 35 can then support the significant mass generated by the cantilever of the movable part 25 thus separated from the seat 11.

Figure 1D:
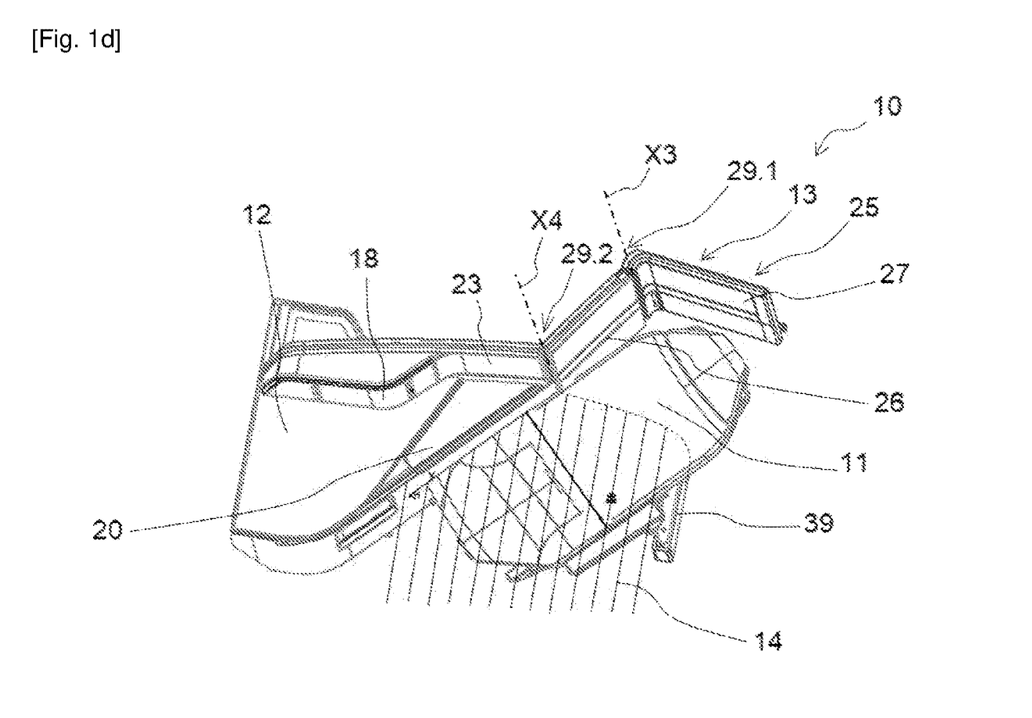
FIG. 1d is a perspective view of the privacy shield of the seat unit in FIG. 1a in the deployed position with the seat in the extended position in order to facilitate installation for a person with reduced mobility.

When the mobile part 25 is in the deployed position, the crew member can command a movement of the seat 11 via the seat control unit 22, so as to lower the seat back 180 degrees to make the seat 11 pass from the seated to lying position and facilitate the installation of the passenger on the seat 11.

Once the passenger has been transferred to the seat 11, the crew member can perform the reverse operations so as to raise the seat back to return the seat 11 to the seated position and then to return the movable part 25 of the shield 13 to retracted position to provide passenger privacy.

In the embodiment in FIGS. 7a, 7b, 8, and 10, the movable part 25 is movable in translation relative to the fixed part 23. For this purpose, the seat unit 10 comprises a carriage 53 carrying the movable part 25 of the privacy shield 13 and at least one slide connection 54, in this case two slide connections 54, allowing a translational movement of the carriage 53 relative to the fixed part 23 to pass from the retracted position to the deployed position and vice versa.

Figure 11:
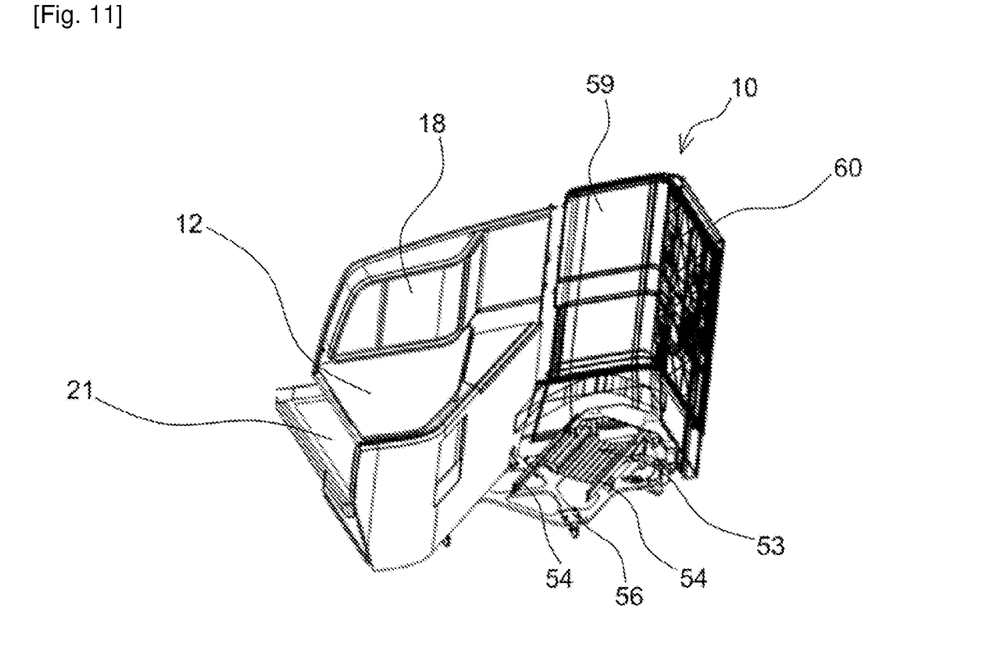
FIG. 11 is a perspective view of the seat unit without the seat so as to make visible the carriage supporting the movable part of the privacy shield.

A slide connection 54 is advantageously installed between the carriage 53 and a support pallet 56 of the seat visible in FIG. 11. The support pallet 56 in particular provides a fastening interface between the seat 11 and the floor of the aircraft cabin.

A slide connection 54 has a longitudinal direction parallel to or coincident with the axis X1 of the seat so as to allow movement of the movable part 25 along the axis X1 of the seat 10, as illustrated in FIG. 7b. This axis X1 here forms a non-zero angle with respect to the axis X2 of the aircraft cabin, for example of about 45 degrees.

A slide connection 54 may be formed by longitudinal guides capable of sliding relative to each other, rails, or any other means suitable for producing a slide connection 54.

Furthermore, the mobile part 25 comprises two panels 59, 60 forming a non-zero angle relative to each other, in particular an angle of about 90 degrees. A panel 59, 60 is preferably made in one piece with the other panel 59, 60, so that the set of two panels 59, 60 forms a single part constituting the movable part 25 of the privacy shield 13. The structure of a panel 59, 60 is similar to that of a flap 26, 27 described previously.

Figure 13:
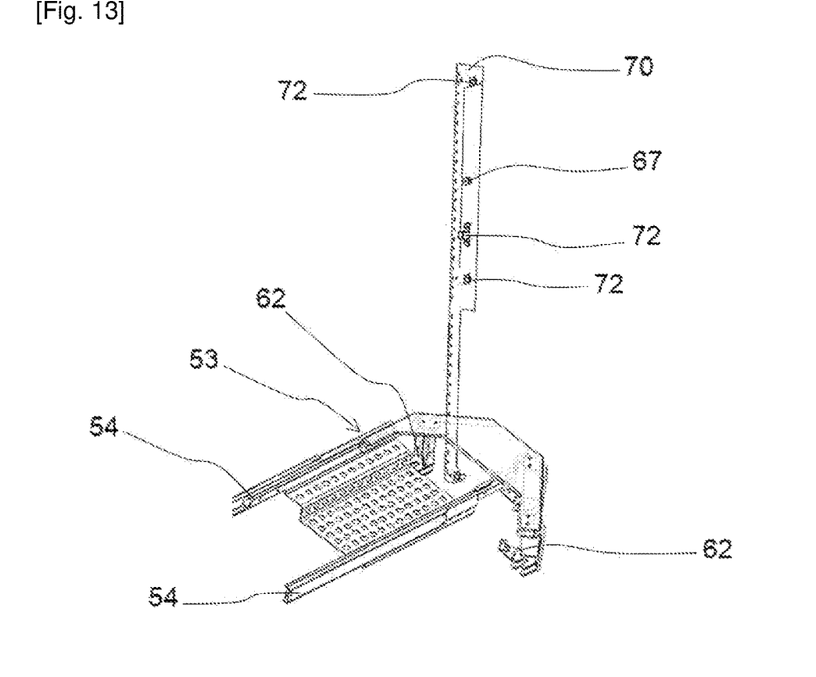
FIG. 13 is a perspective view of the structural elements mechanically connected to the movable part of the privacy shield according to the invention.

In order to mechanically connect the movable part 25 to the carriage 53, said carriage 53 comprises fixing interfaces 62 visible in FIG. 13 and provided with other passage holes for fastener, such as screws, bolts or rivets or any other fastener suitable for the application.

As can be seen in FIG. 8, the seat unit 10 includes a device 63 for locking and unlocking in translation the movable part 25 relative to the fixed part 23 of the privacy shield 13.

The locking and unlocking device 63 comprises a hook-shaped lock 65 movable in rotation between a locking position in which said lock 65 cooperates with a corresponding locking pin 67 secured to the movable part 25 and an unlocking position in which said lock 65 is disengaged from locking pin 67.

Figure 12:
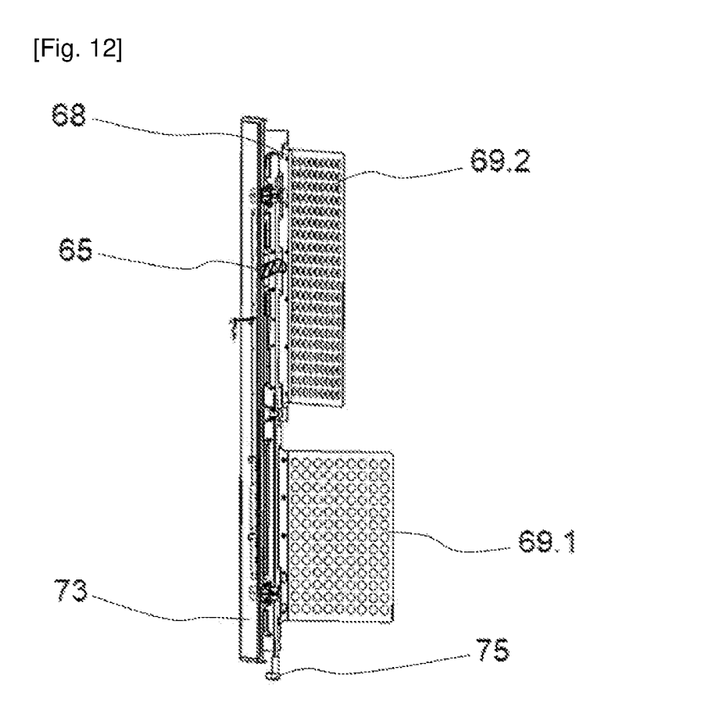
FIG. 12 is a perspective view of a fixed upright of the seat unit according to the invention carrying a locking hook for the movable part of the privacy shield according to the invention.

As can be seen in FIG. 12, the lock 65 may be arranged on a fixed upright 68 mechanically connected to the console 13. The fixed upright 68 carries two panels 69.1, 69.2 similar to the panels 28.1 and 28.2 in FIG. 3. The panel 69.1 is intended to be mechanically connected to a wall of the console 12 at the level of the foot housing 21. The panel 69.2 is fixed to a structural element of the console 12 so as to form a portion of the fixed part 23 of the privacy shield 13.

The locking pin 67 is arranged on a movable upright 70 secured to the movable part 25, as shown in FIG. 13. Advantageously, this movable upright 70 also includes centering pins 72, in this case three centering pins 72, intended to cooperate with corresponding shapes in the fixed amount 68.

Advantageously, as can be seen in FIGS. 8 and 12, there is provided an access shutter 73 to the locking and unlocking device 63.

An actuating means 75, such as a lever or a button, which can be manipulated by a crew member, is capable of controlling a movement of the mobile shutter 73 from a closed position in which the shutter 73 closes an access space to the device 63 to an open position in which the shutter 73 opens the access space to the device 63.

Figure 9A:
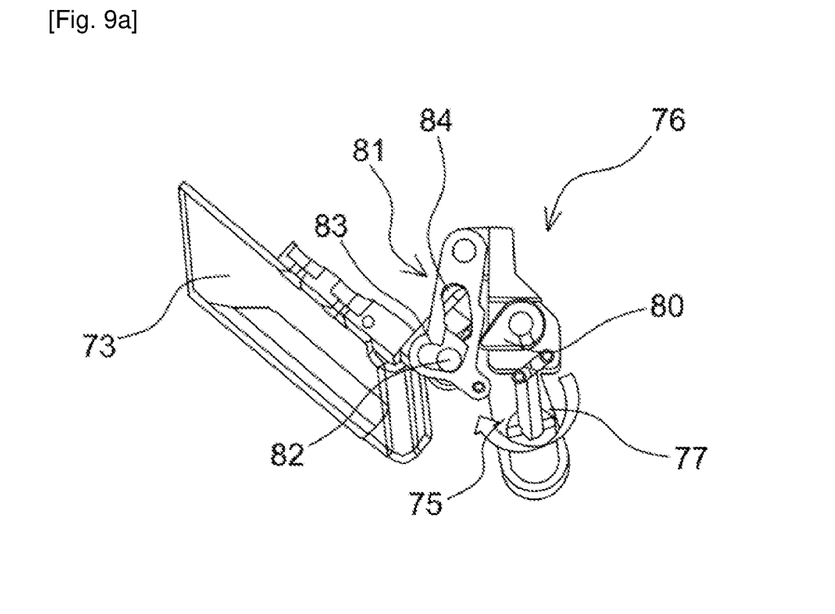
FIGS. 9a to 9c are perspective views illustrating the various stages of deployment of an access shutter to the device for locking and unlocking in translation the movable part of the privacy shield.
Figure 9B:
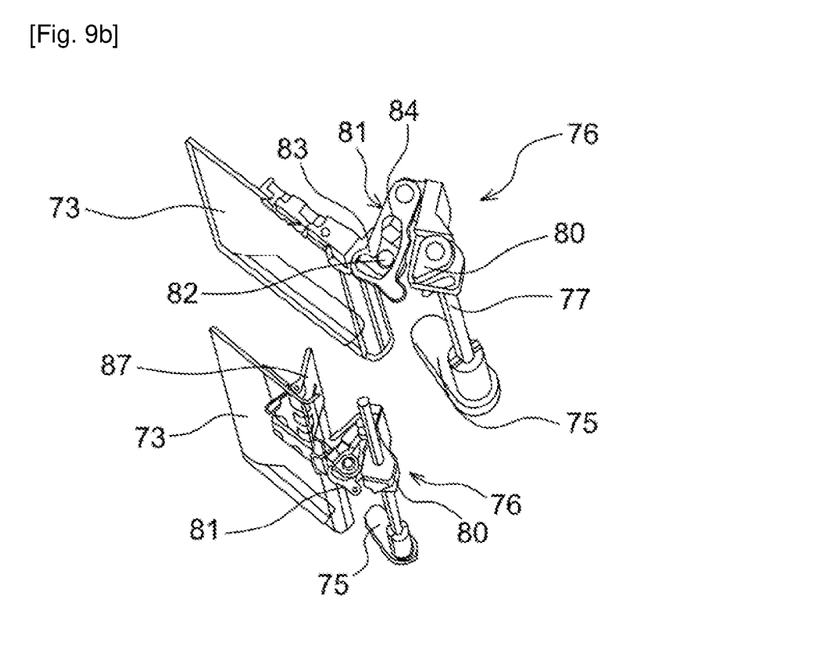
Figure 9C:
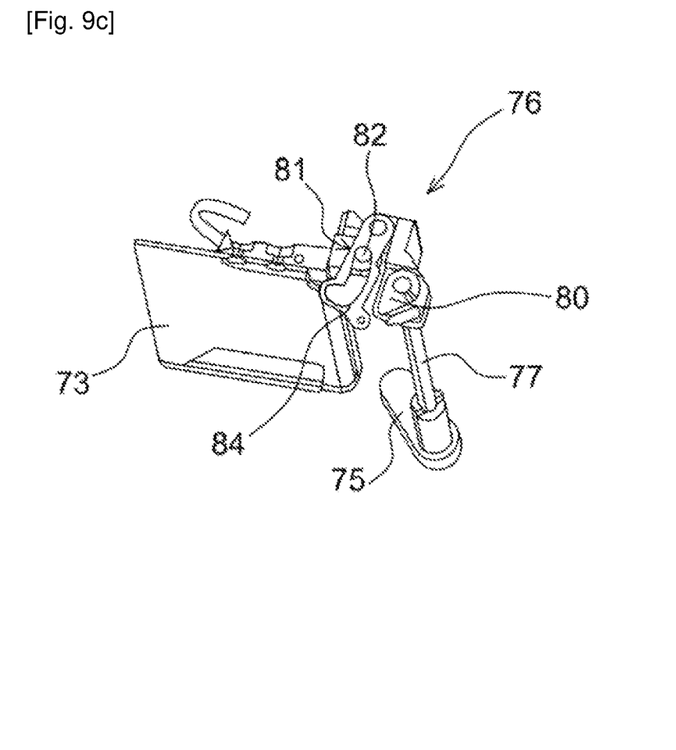

For this purpose, a cam device 76 shown in FIGS. 9a to 9c, is mechanically connected on the one hand to the actuating means 75 via a connecting rod 77 and on the other hand to the shutter 73 of whose rotation is controlled.

As illustrated in FIG. 9a, a manipulation of the actuating means 75 by a crew member causes a rotation of a cam 80, which moves a cam with groove 81 so that a lug 82 can pass a point blocking 83 of the groove 84. As shown in FIG. 9b, a spring hinge 87 then acts on the shutter 73 and causes a movement of the lug 82. As shown in FIG. 9c, the shutter 73 moves into the open position and the lug 82 comes into abutment against one end of the groove 84. The crew member can then have access to the lock 65.

Figure 10:
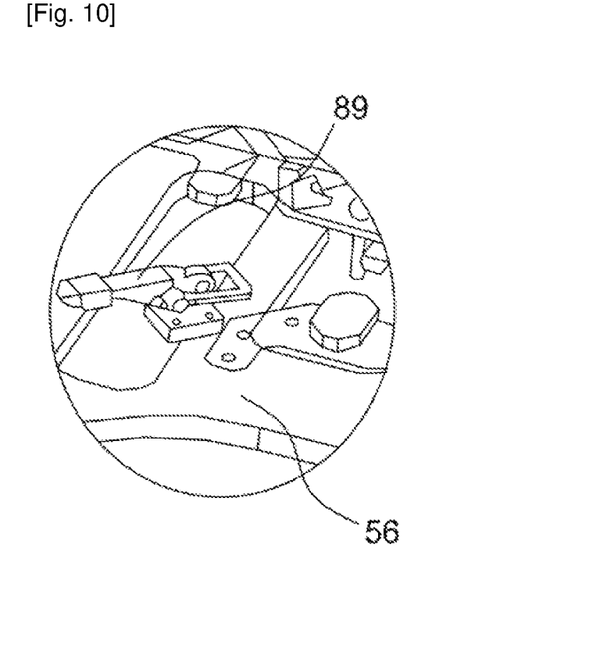
FIG. 10 is a detailed view of a clamping device on a seat support pallet used for locking the movable part of the privacy shield.

It is also possible to provide a clamping device 89 on a support pallet 56 of the seat 11, as shown in FIG. 10. The clamping device 89 is intended to cooperate with a hook of corresponding shape on the movable part 25 in a locked state and to be disengaged from the hook on the movable part 25 in an unlocked state.

It is described below the operation of the privacy shield 13 of the embodiment in FIGS. 7a to 13 comprising a movable part 25 mounted on the carriage 53 able to deploy according to a translational movement.

Initially, as shown in FIG. 7a, the movable part 25 of the privacy shield 13 is in the retracted position. In the retracted position, the mobile part 25 is located in an extension of the fixed part 23.

A crew member can then manipulate the actuating means 75 so as to open the shutter 73 to access the locking and unlocking device 63. The crew member can then release the lock 65 from the locking pin 67.

The crew member also opens the clamping device 89 so as to allow a translation of the mobile part 25 relative to the fixed part 23.

The movable part 25 can then move into its deployed position by sliding the carriage 53 along the slide connection 54, as shown in FIG. 7b. The displacement of the mobile part 25 can be carried out manually or automatically if the carriage 53 is equipped with an electric motor. In the deployed position, the mobile part 25 is located at a distance from the fixed part 23.

When the mobile part 25 is in the deployed position, the crew member can command a movement of the seat 11 via the PCU control module so as to lower the seat back 180 degrees to move the seat 11 from the seated position to the lying position and facilitate the installation of the passenger on the seat 11.

Once the passenger has been transferred to the seat 11, the crew member can carry out the reverse operations so as to raise the seat back to return the seat 11 to the seated position and then to return the mobile part 25 of the shield to the retracted position to confer privacy on passenger.

Figure 14A:
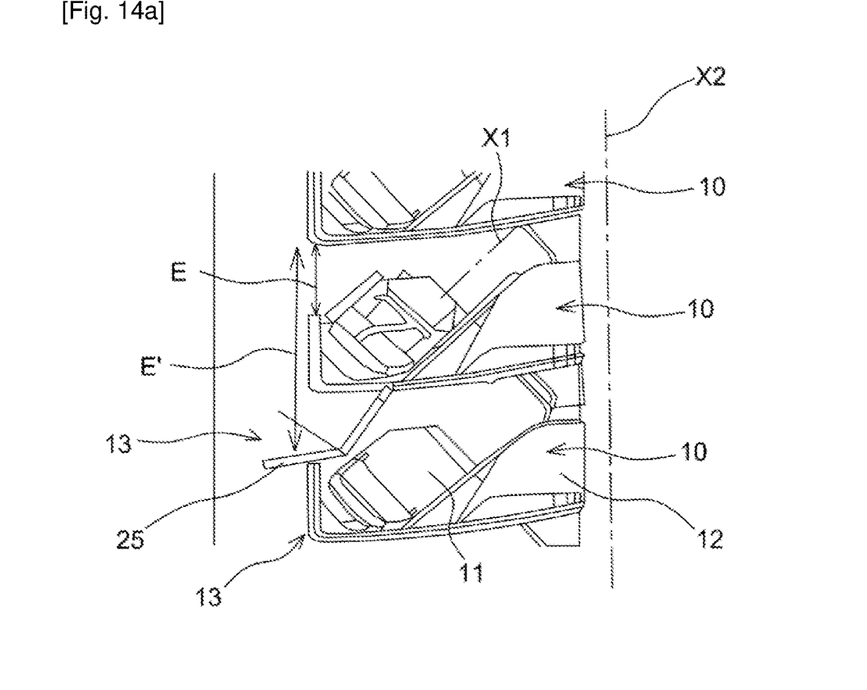
FIGS. 14a and 14b are perspective views respectively of a column of seat units according to the first embodiment and a column of seat units according to the second embodiment.
Figure 14B:
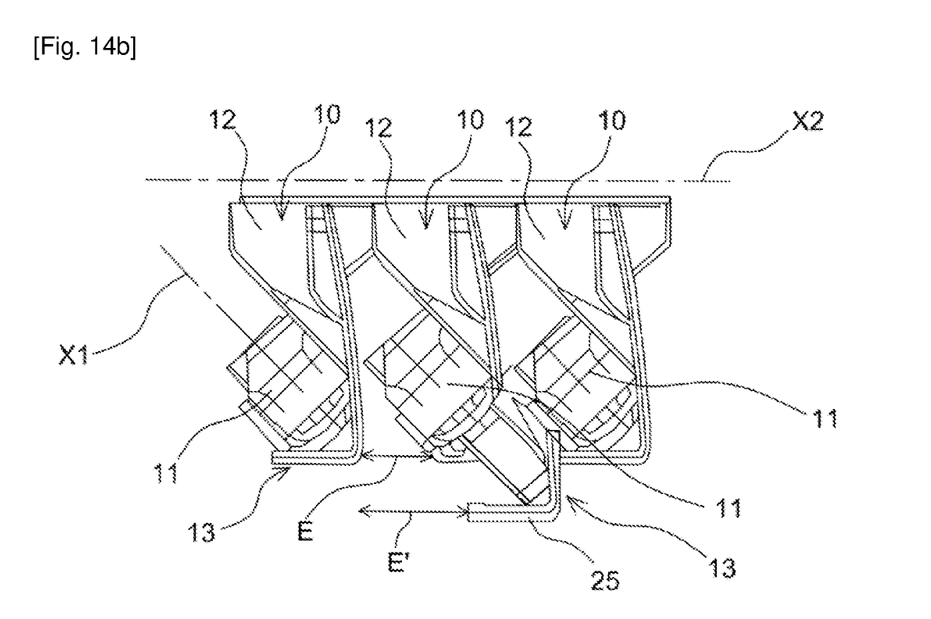

FIGS. 14a and 14b illustrate a column of three seat units 10 arranged one behind the other. These figures show that the two embodiments of the movable part 25 of the privacy shield 13 make it possible to increase the access space to the seat 11 compared to a configuration of conventional seat units 10 with a fixed privacy shield (cf. access space E with a fixed privacy shield and access space E' obtained thanks to the mobile part 25 of the privacy shield 13 in the deployed position.)

The privacy shield 13 may, if necessary, incorporate a curtain airbag on the rear façade.

The fixed part 23 of the privacy shield 13 may also include a removable door on the side of a passageway of the aircraft cabin.

Of course, the different features, variants and/or embodiments of the present invention can be associated with each other in various combinations insofar as they are not incompatible with each other or exclusive of each other.

Furthermore, the invention is not limited to the embodiments described above and provided solely by way of example. It encompasses various modifications, alternative forms and other variants that a person skilled in the art may consider in the context of the present invention and in particular all combinations of the various modes of operation described previously, which may be taken separately or in combination.

The invention claimed is:

1. An aircraft seat unit comprising:
    a seat that is movable between a seated position and a lying position, and
    a privacy shield extending at least partly around the seat:
    the privacy shield comprising a fixed part and a movable part relative to the fixed part,
    the movable part being movable between:
    a retracted position in which the movable part delimits with the fixed part a semi-enclosed space around the seat to confer privacy on the passenger, and
    a deployed position in which the movable part is moved away from the seat so as to clear an access space to said seat,
    wherein the movable part of the privacy shield comprises:
    a primary flap,
    a secondary flap,
    a first pivot connection being arranged between the primary flap and the secondary flap so as to allow rotation of the secondary flap relative to the primary flap around a first axis of rotation,
    a second pivot connection being arranged between the primary flap and the fixed part of the privacy shield so as to allow rotation of the primary flap relative to the fixed part around a second axis of rotation.

2. The seat unit according to claim 1, wherein the movable part is remote from the seat when it is in the deployed position, so that the seat in the lying position extends beyond a vertical projection onto a floor of the semi-enclosed space delimited by the privacy shield when said privacy shield is in the retracted position.

3. The seat unit according to claim 1, wherein the first pivot connection and the second pivot connection are each formed by at least one hinge.

4. The seat unit according to claim 3, wherein the at least one hinge is of the invisible type.

5. The seat unit according to claim 1, further comprising a rod having a first end rotatably mounted relative to the primary flap and a second end rotatably mounted relative to a slider able to slide along a slide arranged on a lower portion of the fixed part of the privacy shield.

6. The seat unit according to claim 1, wherein the seat unit further comprises a device for locking and unlocking in rotation the secondary flap with respect to the fixed part of the privacy shield.

7. The seat unit according to claim 6, characterized in that the device for locking and unlocking in rotation the secondary flap comprises a latch able to selectively cooperate with a striker in a locked state or to be disengaged from the striker in an unlocked state.

8. The seat unit according to claim 1, wherein the seat unit further comprises device for locking and unlocking in rotation the primary flap with respect to the fixed part of the privacy shield.

9. The seat unit according to claim 8, wherein the device for locking and unlocking in rotation the primary flap comprises a finger capable of partially surrounding in a selective manner a stud in a locked state and being disengaged from the stud in an unlocked state.

\* \* \* \* \*